United States Patent [19]

Simin

[11] Patent Number: 5,089,912

[45] Date of Patent: Feb. 18, 1992

[54] RETRACTABLE ANTIGLARE SHIELD FOR EXTERIOR REAR VIEW MIRRORS

[75] Inventor: Gerald L. Simin, Holly, Mich.

[73] Assignee: General Motors Corporation, Detroit, Mich.

[21] Appl. No.: 589,350

[22] Filed: Sep. 28, 1990

[51] Int. Cl.⁵ ............................................. G02B 27/00
[52] U.S. Cl. .................................. 359/608; 359/601; 296/97.2; 296/97.4; 296/97.8
[58] Field of Search ............... 350/276 R, 277, 278, 350/283; 296/96.19, 97.1, 97.2, 97.3, 97.4, 97.8

[56] References Cited

U.S. PATENT DOCUMENTS

| | | | |
|---|---|---|---|
| 1,781,557 | 11/1930 | Reukauf, Jr. | 350/283 |
| 3,183,033 | 5/1965 | Stulbach | 296/97.2 |
| 4,560,251 | 12/1985 | Murjahn | 350/283 |
| 4,988,139 | 1/1991 | Yamada | 296/97.2 |

*Primary Examiner*—Bruce Y. Arnold
*Assistant Examiner*—J. P. Ryan
*Attorney, Agent, or Firm*—Edward J. Biskup

[57] ABSTRACT

A retractable antiglare shield for an exterior rear view mirror that is mounted in a vehicle door and includes a flexible shield which can be stored in the door when not in use. This shield is supported on a roller mechanism and has its upper end formed with a support member which is insertable between the window and the door frame for maintaining the shield in the operative raised position.

1 Claim, 2 Drawing Sheets

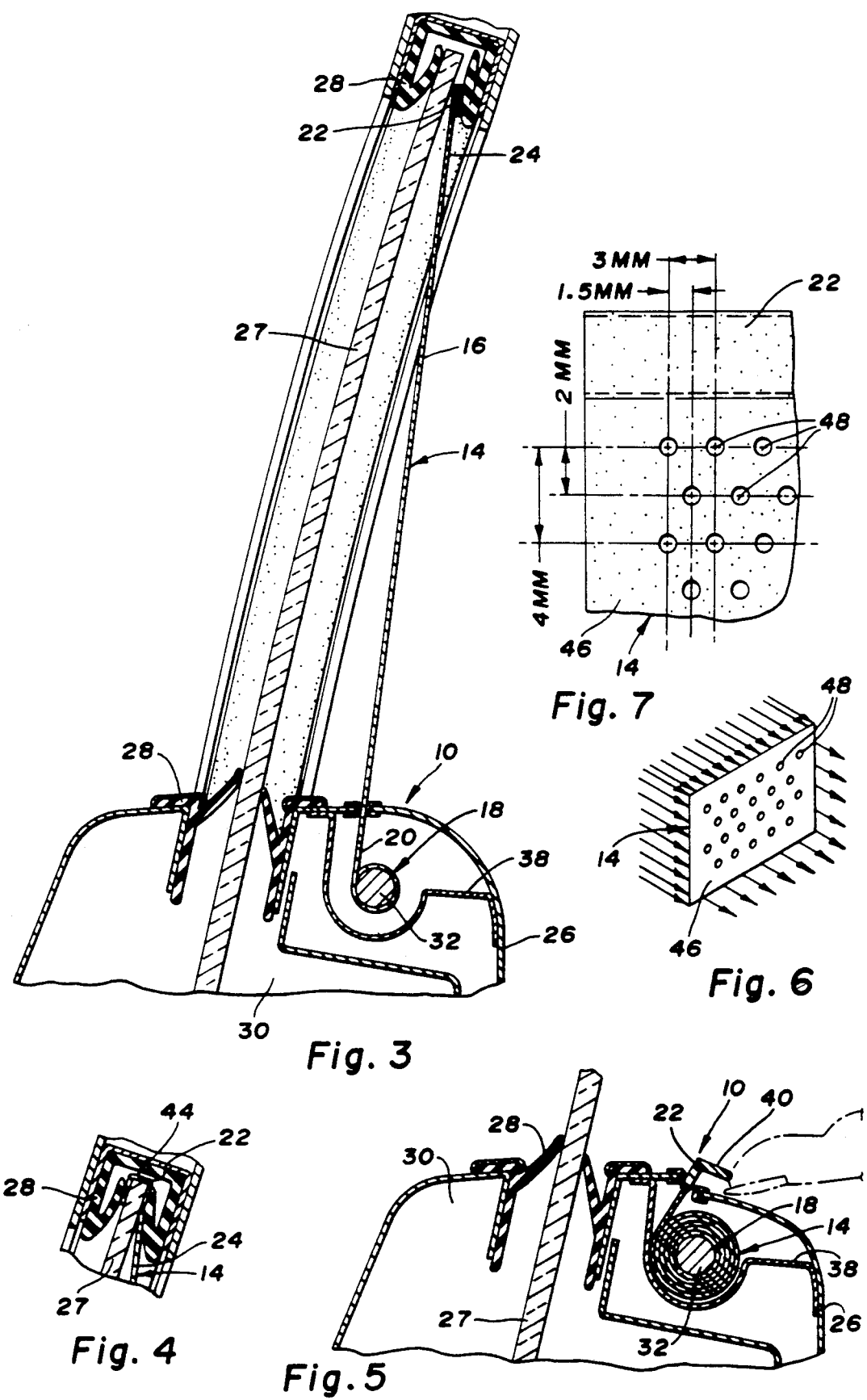

RETRACTABLE ANTIGLARE SHIELD FOR EXTERIOR REAR VIEW MIRRORS

BACKGROUND OF THE INVENTION

This invention relates generally to glare shields for rear view mirrors and more specifically to glare shields for exterior rear view mirrors.

Glare from reflected headlamps in rear view mirrors of automobiles is a common annoyance for a driver of an automobile. In order to minimize the glare, interior rear view mirrors are often equipped with some mechanism to reduce the glare associated with headlights from a trailing vehicle. Such mirrors are common, and one such mirror which could be used as an interior nonglare mirror is described in U.S. Pat. No. 4,527,860 issued July 9, 1985 to James A. Roof. Therefore, glare from the headlights of a following vehicle reflected by the inlerior rear view mirror need no longer be an irritant to the driver of the automobile.

The above type of mirror, however, is not entirely satisfactory for use with exterior rear view mirrors. One reason being that the required shifting of the position of the prismatic mirror from inside the vehicle increases the complexity and manufacturing cost of the operating mechanism In addition, use of a prismatic mirror as an exterior rear view mirror can result in the driver seeing ghost images reflected by the face of the mirror.

There have been other attempts to prevent exterior rear view mirror glare, one of which is shown in an advertisement appearing in the newspaper, *USA Today*, Wednesday, Nov. 8, 1989, page 8D, bottom, entitled "You'll never be blinded from the back again!". This advertisement shows a device called GLAREBUSTERS, which is similar to the present invention in that it is intended to decrease headlight glare of vehicles approaching from behind. GLAREBUSTERS night driving shields comprise a two unit set, each part of which comprises a tinted plate of DuPont LUCITE and a plurality of suction cups to removably attach the plate to a car window. Although this type of shield may serve to reduce headlight glare, one problem is that of not being large enough to block the glare if the driver moves to another position relative to the GLAREBUSTERS. Also, since the GLAREBUSTERS are removable, they can be lost if misplaced when not in use and could fall off of the car window during operation.

Another antiglare shield similar to that of the present invention can be found in U.S. Pat. No. 4,560,251 issued Dec. 24, 1985 to Waldemar Mürjahn. This patent discloses an antiglare shield for exterior rear view mirrors which comprises an antiglare sheet, a stop, and a section which fits in an interior of a vehicle window shaft. This antiglare shield covers a larger area than that provided by the GLAREBUSTERS do, and has a part of the shield wedged into the window shaft. But this shield is not integral with the car, so it can be misplaced when not in use as is the case with the GLAREBUSTERS.

French patent 2,500,795 issued to Jean-Claude Tamagna discloses still another form of an antiglare shield. This particular shield comprises a plate of antiglare material which is installed in a car window in such a way that it may be rotated to be between a driver and an exterior mirror, or can be stored inside a window shaft of a vehicle. This device is pivoted at a front edge and can be rotated into position when required. This device has the advantage of being connected to the car so that it is not as likely to be lost or misplaced. One problem with this device, however, is that it needs a large space in the interior of the window shaft to be stored properly, which makes the use of this device impractical.

SUMMARY OF THE INVENTION

An object of the present invention is to provide a new and improved antiglare shield for a vehicle side window that reduces the headlamp glare produced by the exterior rear view mirrors.

Another object of the present invention is to provide a new and improved antiglare shield that covers a large enough area of a side window so as to remove glare for different positions of a driver of a vehicle.

Yet another object of the present invention is to provide a new and improved antiglare shield that is integral with the door and therefore will not get misplaced or lost.

Still another object of the present invention is to provide a new and improved antiglare shield that will store conveniently within a vehicle door and not take up excessive space while in storage.

The present invention meets the above described objects by providing an improved antiglare shield that has a shield made from vinyl or other thin, flexible material which filters light that is transmitted through the shield. The shield is connected at a lower end to a shaft of a roller mechanism within a vehicle door. The roller mechanism comprises the shaft, an end cap fixedly connected to both ends of the shaft, and a negator spring connected to an end cap. The roller mechanism is mounted within the door so that the shield may be retracted into a stored position when not in use. The shield is retracted in the manner of a window shade and is stored within the vehicle door.

The shield is connected at an upper end to a support member and a handle is integrally connected to the support member to allow the antiglare shield to be removed from storage within the vehicle door. In one form of the present invention the support member has a hook connected to one end of the support member and the hook can be placed over the edge of the window glass of the door. In another form of the present invention, a forward edge of the support member itself is positioned between a seal and the window. With either variant, the support member is positioned to keep the shield parallel to the window and between the driver and the exterior rear view mirror.

Other objects and features of the present invention will become apparent to those skilled in the art from the following detailed description of a preferred embodiment of the invention that sets forth the best mode of the invention contemplated by the inventors and which is illustrated in the accompanying sheets of drawing.

BRIEF DESCRIPTION OF THE DRAWINGS

FIG. 3 is a sectional view taken along line 3—3 of FIG. 1 showing the raised operative position of the retractable antiglare shield held in place by a portion of the support member being inserted between the window seal and the window glass of the door of the vehicle.

FIG. 4 is a sectional view similar to that of FIG. 3, 1 showing the support member of the retractable antiglare shield which, in this case, is held in place by a hook integrally connected to the support member and hooked over the edge of the window glass of the door of the vehicle.

FIG. 5 is a sectional view taken along line 5—5 of FIG. 1 showing the shield in a stored position and having a handle that can be grasped to remove the antiglare shield from the stored position.

FIG. 6 is a perspective view of the shield of the present invention showing the flexible shield made from an opaque material with a plurality of small holes which allows some light to pass through the shield.

FIG. 7 is a frontal view of the shield seen in FIG. 6 showing the flexible shield made from an opaque material with a plurality of small holes, and showing an example pattern for the plurality of small holes.

DETAILED DESCRIPTION OF THE PREFERRED EMBODIMENTS

Figure 1:
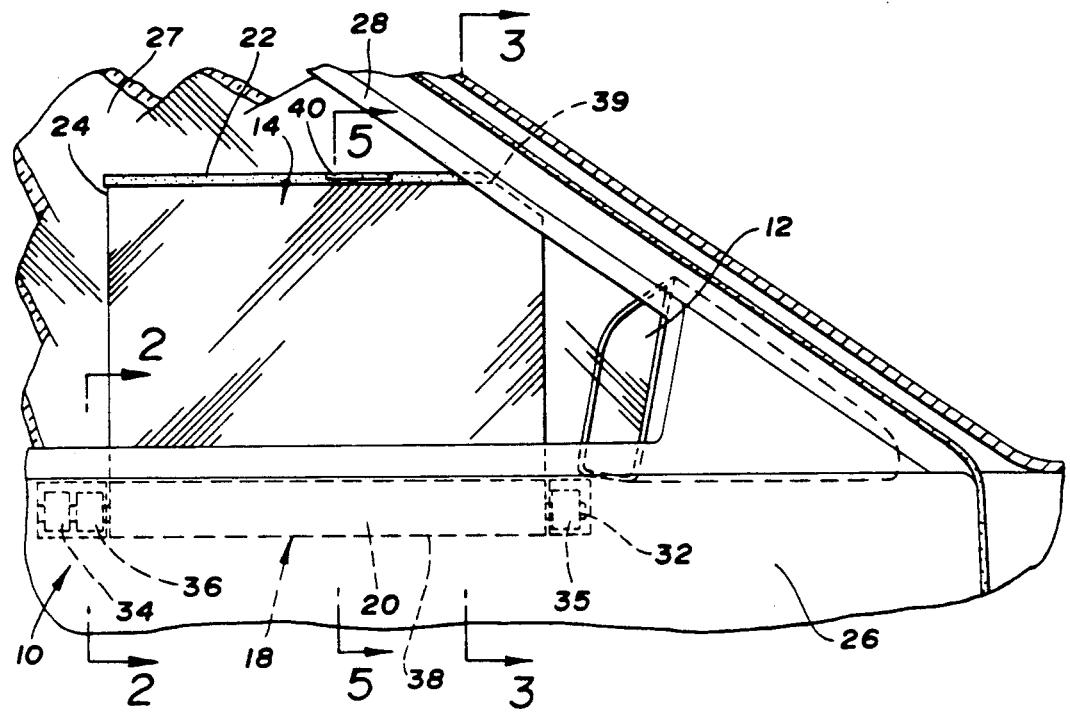
FIG. 1 is a partial view of a window of a vehicle door which includes a retractable antiglare shield according to the present invention.

Referring now to the drawings, a retractable antiglare shield 10 according to the present invention for use with an exterior rear view mirror 12 is illustrated in FIG. 1. The retractable antiglare shield 10 comprises a shield 14 made from a thin, flexible material such as vinyl, a roller mechanism 18 connected to and supporting a lower end 20 of the shield 14, and a support member 22 connected to an upper end 24 opposite the lower end 20 of the shield.

Figure 2:
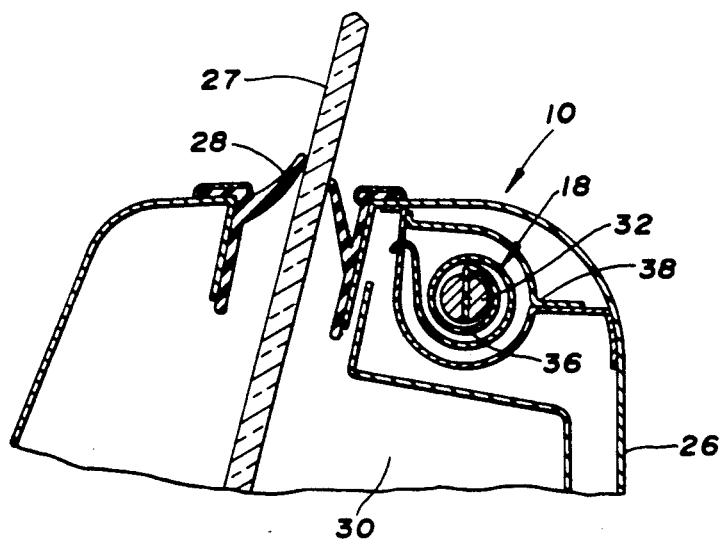
FIG. 2 is a sectional view taken along line 2—2 of FIG. 1 showing the negator spring element construction of the roller mechanism of the retractable antiglare shield.

As seen in FIGS. 2 and 3, the retractable antiglare shield 10 is mounted within a door assembly 26 of a motor vehicle. The door assembly 26 includes the exterior rear view mirror 12, a window glass 27 slidably mounted in the door assembly 26, and a window seal 28 made of a elastomeric material. As is conventional, the door assembly 26 has a hollow space 30 that the window glass 27 may retract into for storage.

As mentioned above, the shield 14 is connected at its lower end 20 to the roller mechanism 18. The roller mechanism 18 comprises a shaft 32, a pair of end caps 34 and 35, a negator spring element 36, and a housing 38 which is secured to the door assembly 26. The shaft 32 is fixedly attached to the end caps 34 and 35, which in turn are rotatably mounted to the housing 38. The negator spring element 36 is attached at one end of the shaft 32 and operates to wind up the shield 14 in the manner of a window shade for storing the shield 14 when not in use. The roller mechanism is supported in the position shown by fixedly attaching the housing 38 to the door assembly 26 within the hollow space 30 so that the shield 14 is concealed when stored within the hollow space of the door assembly 26.

As shown in FIG. 5, the support member 22 includes a handle 40 which is integral with the support member 22. When the shield 14 is wound around the shaft 32 in a stored position, the handle 40 acts as a stop to keep the support member 22 from being retracted into the roller mechanism 18. The handle 40 is accessible and can be grasped by a driver of the motor vehicle so that the shield 14 can be removed from storage and put into use easily.

During operation, the support member 22 serves as a stiffener for mounting the shield 14 in a single plane adjacent to the window glass 27. This positions the shield 14 so that the shield 14 covers a portion of the window glass 27 through which the exterior rear view mirror 12 is visible to the driver of the motor vehicle. As shown in FIG. 3, the support member 22, and therefore the shield 14, is held in the raised position by inserting and wedging a forward end 39 of the support member 22 between the window seal 28 and the window glass 27. The forward end 39 of the support member 22 is then held in place by friction.

Another method of holding the support member 22 in position is shown in FIG. 4. In this method the forward end 39 of the support member 22 includes an integral hook 44. The hook 44 is hooked over the edge of the window glass 27 so that the shield 14 maintains the raised position seen in FIG. 1 and thereby covers the portion of the window glass 27 through which the exterior rear view mirror 12 is visible to the driver of the motor vehicle.

The shield 14 can be constructed from different materials for reducing glare from the external rear view mirrors 12. For example, the shield 14 as seen in FIG. 1 is made from a tinted or translucent material that filters light in the manner of a pair of sunglasses. Then when light from a headlamp of a following vehicle reflects off the external rear view mirrors 12, it will pass through the shield 14 which covers the portion of the window glass 27 through which the exterior rear view mirror 12 is visible to the driver of the motor vehicle. Thus, the light will be filtered so that glare does not annoy the driver of the motor vehicle.

Another way the shield 14 can reduce glare is shown in FIG. 6. Here the shield 14 is constructed from an opaque material which does not allow light to pass though the shield 14. A plurality of small holes 48 are arranged in a pattern on the opaque material. The plurality of small holes 48 allows only some light to pass through the shield 14. In this way the opaque material 46 limits the amount of light 48 and reduces the glare that can annoy the driver of the motor vehicle.

An example of a pattern of small holes is shown in FIG. 7. Here one set of 1.0 mm holes are located in columns 3.0 mm apart. A second set of 1.0 mm holes are located in columns offset from the first set of holes in columns by 1.5 mm. In each group of columns, the 1.0 mm holes are arranged in rows 2.0 mm apart, with rows of the second group of columns being offset from rows of the first group of columns by 1.0 mm.

As alluded to herein before, the shield 14 should be made to cover a large enough reflected field of vision so that the operator can move slightly within the motor vehicle and not be annoyed by glare that is not reduced by the retractable antiglare shield 10. At the same time the shield 14 should not be made so large as to be difficult or unwieldy in use. The proper size of the shield 14 will depend upon the size and location of the exterior rear view mirror, as well as space availability in the door assembly and design of the door frame of the motor vehicle in which it is to be used.

I wish it to be understood that I do not desire to be limited to the exact details of construction shown and described, because obvious modifications will occur to a person skilled in the art.

The embodiments of the invention in which an exclusive property or privilege is claimed are defined as follows:

1. A retractable antiglare shield for exterior rear view mirrors mounted on a door of a motor vehicle with a window glass and movable between a raised position and a stored position comprising:

a shield made from a thin, flexible material which reduces glare from a following vehicle;

the door having a hollow space;

a shaft rotatably mounted along its longitudinal axis in the hollow space of the door of the motor vehicle;

the shaft being fixedly connected to a lower end of the shield;

a support member fixedly connected to the shield at an upper end of the shield opposite the lower end of the shield for grasping the support member when the shield is in a stored position in the hollow space of the door of the motor vehicle;

means connected to the shaft for winding the shield around the shaft for maintaining the shield in a stored position within the hollow space;

and means including the support member for holding the shield in the raised position so that the shield covers a portion of the window glass through which the exterior rear view mirror is visible to a driver of the motor vehicle;

said means for holding the shield in the raised position including a forward end of the support member which is inserted between a window seal and the window glass of the door so that the support member is held in the raised position such that the support member serves as a stiffener for supporting the shield, and the shield covers a portion of the window glass through which the exterior rear view mirror is visible to a driver of the motor vehicle.

* * * * *